United States Patent

Mieczkowska et al.

Patent Number: 5,516,604
Date of Patent: May 14, 1996

[54] ADDITIVES FOR PRIMARY ELECTROCHEMICAL CELLS HAVING MANGANESE DIOXIDE CATHODES

[75] Inventors: Jola E. Mieczkowska, W. Sussex, Great Britain; Martin W. Howard, E. Sussex, Great Britain

[73] Assignee: Duracell Inc., Bethel, Conn.

[21] Appl. No.: 387,536

[22] Filed: Feb. 13, 1995

[51] Int. Cl.$^6$ .............................. H01M 4/50; H01M 4/56
[52] U.S. Cl. ............................................ 429/224; 429/218
[58] Field of Search ...................................... 429/218, 224

[56] References Cited

U.S. PATENT DOCUMENTS

| | | | |
|---|---|---|---|
| 5,156,934 | 10/1992 | Kainthia et al. | 429/224 |
| 5,227,261 | 7/1993 | Georgopoulos | 429/56 |
| 5,391,365 | 2/1995 | Wang et al. | 423/605 |

Primary Examiner—Stephen Kalafut
Assistant Examiner—Richard H. Lilley, Jr.
Attorney, Agent, or Firm—Ronald S. Cornell; Barry D. Josephs; Robert J. Feltovic

[57] ABSTRACT

The invention relates to alkaline cells containing manganese dioxide cathode active material. A substance selected from the group of compounds $Bi_2O_3$, $PbO_2$, $SnO_2$, $Co_3O_4$, CoO, $Bi_2O_3 \cdot 3ZrO_3$ and $K_2Cr_2O_7$ is added to the cathode of conventional alkaline cells typically having an anode comprising zinc and cathode comprising manganese dioxide and an alkaline electrolyte. The additive increases the specific capacity (amp-hr/g) of the manganese dioxide in the cathode.

6 Claims, No Drawings

ADDITIVES FOR PRIMARY ELECTROCHEMICAL CELLS HAVING MANGANESE DIOXIDE CATHODES

The invention relates to alkaline electrochemical cells with manganese dioxide cathode and compounds selected from the group $Bi_2O_3$, $PbO_2$, $SnO_2$, $Co_3O_4$, $CoO$, $Bi_2O_3.3ZrO_3$ and $K_2Cr_2O_7$ added to the cathode material to improve the specific capacity of the manganese dioxide.

Primary alkaline cells typically contain zinc anode active material, alkaline electrolyte, a manganese dioxide cathode active material, and an electrolyte permeable separator film, typically of cellulose. Conventional alkaline cells may contain zero-added mercury such that the total mercury content is less than about 50 parts mercury per million parts by weight of the total cell. The anode active material comprises zinc particles admixed with conventional gelling agents, such as carboxymethylcellulose or acrylic acid copolymers, and electrolyte. The gelling agent holds the zinc particles in place and in contact with each other. A conductive metal nail, known as the anode current collector, is typically inserted into the anode active material. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity. Conventional alkaline cells are encased in a steel container to retain the cell components and reduce the chance of leakage.

Since commercial cell sizes are fixed it has been desirable to attempt to enhance performance and/or useful service life of the cell by increasing the surface area of the electrode active material and by packing greater amounts of the active material into the cell. This approach has practical limitations, since if the active material is packed too densely into the cell this can reduce the rate of electrochemical reaction during discharge, in turn reducing service life. Other deleterious effects such as polarization can occur, particularly at high current drain rates. Polarization limits the mobility of ions within the electrode active material and within the electrolyte, which in turn retards performance and service life. Thus, it is desirable to provide a way of retarding such deleterious effects which in turn can increase performance and/or useful service life of the cell.

One way of retarding such deleterious effects is to increase the actual specific capacity of the $MnO_2$ cathode material, typically electrolytic manganese dioxide (EMD). The EMD in conventional alkaline cells has a theoretical specific capacity of about 308 mAmp-hr per gram. The actual specific capacity of the EMD material realized in discharge of a conventional alkaline cell is less than theoretical because of the inefficiencies caused by polarization effects and other phenomena which effect the cathode reactions and efficiency of electron transfer. For example, the actual specific capacity of EMD in a standard alkaline cell when discharged at a high rate (at 3.9 ohms load) to a potential of 0.8 volts may be about 195 mAmp-hr/g for a continuous discharge and 220 mAmp-hr for intermittant discharge. This would correspond to an efficency of EMD of 63% and 71%, respectively.

It has been discovered that the addition of small amounts of specific compounds to the cathode of conventional primary zinc/$MnO_2$ alkaline cells increases the actual specific capacity (amp- hr/g) of the $MnO_2$ cathode active material in the cell. The compounds which have been found to increase the actual specific capacity of the $MnO_2$ material in such cells are: $Bi_2O_3$, $PbO_2$, $SnO_2$, $Co_3O_4$, $CoO$, $Bi_2O_3.3ZrO_3$ and $K_2Cr_2O_7$ and combinations thereof. The inclusion of a cathode additive selected from the foregoing group of compounds advantageously improves the specific capacity of the $MnO_2$ cathode active material in such cells. These compounds may be added to the cathode so that their total weight comprises between about 0.1 to 10 percent by weight of the total cathode.

The following examples illustrate the invention and advantages derived therefrom. (All compositions are by weight unless otherwise specified.)

Example 1 (Comparative Example)

A conventional primary zinc/manganese dioxide alkaline (standard D cell), is prepared with conventional cathode and anode active material, electrolyte and separator membrane. The anode material may be in the form of a gelled mixture containing mercury free (zero-added mercury) zinc alloy powder. The total mercury content of the cell is thus less than 50 parts mercury per million parts cell weight. The anode mixture may typically contain aqueous KOH solution, gelling agent, e.g. acrylic acid copolymer such as CARBOPOL C934 from B. F. Goodrich; and surfactants e.g. organic phosphate ester surfactant GAFAC RA600 from Rhone Poulenc. The separator membrane can be a conventional electrolyte permeable membrane of polyvinyl alcohol/rayon material. The electrolyte is an aqueous solution of KOH containing about 40 wt % KOH and 2 wt % ZnO, hereinafter referred to as "aqueous KOH solution".

The cathode active material in the standard cell has the following composition:

Electrolytic manganese dioxide (84 wt %), graphite (9.5 wt %) and a 7 Normal "aqueous KOH solution" (6.5 wt %).

Fresh standard cells are dicharged to a cut-off voltage of 1.0 volt and 0.8 volt each on the basis of a continuous discharge and an intermittant discharge. The continuous discharge is carried out by discharging the cell at a contstant current drain rate of about 410 milliamp (equivalent to an average load of about a 2.2 ohm) throughout. The intermittant discharge is carried out by discharging the cell at this same constant current but applied for 1 hour followed by 5 hour recovery cycles. In each case the actual specific capacity (mAmp-hr/g) of $MnO_2$ in the cathode is calculated by multiplying the current drain by the time taken to reach the designated cut-off voltage divided by the weight of $MnO_2$ in the cathode.

Example 2 (Comparative Example)

The same standard cells as in Example 1 are prepared. These cells are discharged to 1.0 and 0.8 volts under continuous and intermittant discharge conditions as in Example 1 except that a constant current drain of 274 mAmp (equivalent to a 3.9 ohm load) is employed. In each case the actual specific capacity of the $MnO_2$ in the cathode is calculated in the manner described in Example 1.

Example 3

Experimental zinc/$MnO_2$ size D alkaline cells identical to that referenced in Example 1 are prepared, except that in making the experimental cell an amount (gms) of $PbO_2$ is added so that the total cathode material comprises 5.0 percent by weight $PbO_2$. The amount of $MnO_2$ in the cathode is reduced by an equal amount (gms) so that the total cathode weight in the experimental cell is the same as in the standard cell of Example 1. Thus the cathode composition of the experimental cell is: 79% electrolytic manganese dioxide (EMD), 9.5% graphite, 6.5% KOH solution and 5% $PbO_2$. Experimental cells are discharged to 1.0 volt and 0.8 volt at the same continuous and intermittant discharge conditions as in Example 1. During discharge the drain rates are kept constant at 410 milliamps (equivalent to an average load of about 2.2 ohms) as in Example 1. The specific capacity (mAmp-hr/g) of the $MnO_2$ in the experimental cells is calculated in each case from the weight of $MnO_2$ in the cells, the current drain, and discharge time required to reach the designated cut-off voltage, as described in Example 1.

In each case the actual specific capacity of the $MnO_2$ in the experimental cell increases over the specific capacity of the $MnO_2$ in the standard cell, at the same discharge conditions and drain rates. At a constant drain rate of 410 mAmp the increase in specific capacity of the $MnO_2$ in the experimental cell over that of the standard cell is 12.8% for continuous discharge to 1.0 volt and 15.2% for continuous discharge 0.8 volt. At the same drain rate of 410 mAmp the increase in specific capacity of the $MnO_2$ in the experimental cell over that of the standard cell is 9.5% for intermittent discharge to 1.0 volt and 10.2% for intermittent discharge to 0.8 volt. These increases are summarized in Table 1.

Example 4

The same experimental cells as in Example 3 are prepared execpt that $Bi_2O_3$ is added to the cathode material instead of $PbO_2$. Thus the cathode composition for the experimental cells is: 79% electrolytic manganese dioxide (EMD), 9.5% graphite, 6.5% KOH solution and 5% $Bi_2O_3$. These experimental cells are discharged at a constant current of 274 mAmp (equivalent to an average load of 3.9 ohm) in the same manner as in discharge of the standard cell of Example 2. The specific capacity (mAmp-hr/g) of the $MnO_2$ in the experimental cells is calculated in each case in the manner described in Example 1.

In each case the specific capacity of the $MnO_2$ in the experimental cell increases over the specific capacity of the $MnO_2$ in the standard cell (Example 2) for the corresponding discharge condition and current drain. Thus, at a constant current drain of 274 mAmp (3.9 ohm load) the increase in specific capacity of the $MnO_2$ in the experimental cell over that of the standard cell is 9.0% for continuous discharge to 1.0 volt and 12.0% for continuous discharge to 0.8 volt. At the same drain rate of 274 mAmp the increase in specific capacity of the $MnO_2$ in the experimental cell over that of the standard cell is 5.9% for intermittent discharge to 1.0 volt and 6.8% for intermittent discharge to 0.8 volt. These increases are summarized in Table 1.

Example 5

The same experimental cells as in Example 3 are prepared execpt that $SnO_2$ is added to the cathode material instead of $PbO_2$. Thus the cathode composition for the experimental cells is: 79% electrolytic manganese dioxide (EMD), 9.5% graphite, 6.5% KOH solution and 5% $SnO_2$. These experimental cells are discharged at a constant current of 274 mAmp (equivalent to an average load of 3.9 ohm) in the same manner as in discharge of the standard cell of Example 2. The specific capacity (mAmp-hr/g) of the $MnO_2$ in the experimental cells is calculated in each case in the manner described in Example 1.

In each case the specific capacity of the $MnO_2$ in the experimental cell increases over the specific capacity of the $MnO_2$ in the standard cell (Example 2) for the corresponding discharge condition and current drain. Thus, at a constant current drain of 274 mAmp (3.9 ohm load) the increase in specific capacity of the $MnO_2$ in the experimental cell over that of the standard cell is 9.3% for continuous discharge to 1.0 volt and 7.9% for continuous discharge to 0.8 volt. At the same drain rate of 274 mAmp the increase in specific capacity of the $MnO_2$ in the experimental cell over that of the standard cell is 4.5% for intermittent discharge to 1.0 volt and 5.3% for intermittent discharge to 0.8 volt. These increases are summarized in Table 1.

Example 6

The same experimental cells as in Example 3 are prepared execpt that $Co_3O_4$ is added to the cathode material instead of $PbO_2$. Thus the cathode composition for the experimental cells is: 79% electrolytic manganese dioxide (EMD), 9.5% graphite, 6.5% KOH solution and 5% $Co_3O_4$. These experimental cells are discharged at a constant current of 274 mAmp (equivalent to a 3.9 ohm load) in the same manner as in discharge of the standard cell of Example 2. The specific capacity (mAmp-hr/g) of the $MnO_2$ in the experimental cells is calculated in the manner described in Example 1.

In each case the specific capacity of the $MnO_2$ in the experimental cell increases over the specific capacity of the $MnO_2$ in the standard cell (Example 2) for the corresponding discharge condition and current drain. Thus, at a constant current drain of 274 mAmp (3.9 ohm load) the increase in specific capacity of the $MnO_2$ in the experimental cell over that of the standard cell is 4.2% for continuous discharge to 1.0 volt and 5.6% for continuous discharge to 0.8 volt. These increases are summarized in Table 1.

Example 7

The same experimental cells as in Example 3 are prepared execpt that CoO is added to the cathode material instead of $PbO_2$. Thus the cathode composition for the experimental cells is: 79% electrolytic manganese dioxide (EMD), 9.5% graphite, 6.5% KOH solution and 5% CoO. These experimental cells are discharged at a constant current of 274 mAmp (equivalent to an average load of 3.9 ohm) in the same manner as in discharge of the standard cell of Example 2. The specific capacity (mAmp-hr/g) of the $MnO_2$ in the experimental cells is calculated in each case in the manner described in Example 1.

The specific capacity of the $MnO_2$ in the experimental cell increases over the specific capacity of the $MnO_2$ in the standard cell (Example 2) for the corresponding discharge condition and current drain in all cases except intermittent discharge to 1.0 volt. At a constant current drain of 274 mAmp (equivalent to an average load of 3.9 ohm) the increase in specific capacity of the $MnO_2$ in the experimental cell over that of the standard cell is 7.0% for continuous discharge to 1.0 volt and 4.7% for continuous discharge to 0.8 volt. At the same drain rate of 274 mAmp there is a decrease in specific capacity of the $MnO_2$ in the experimental cell over that of the standard cell of 0.1% for intermittent discharge to 1.0 volt and an increase of 2.5% for intermittent discharge to 0.8 volt. These changes are summarized in Table 1.

Example 8

The same experimental cells as in Example 3 are prepared execpt that $Bi_2O_3.3ZrO_2$ is added to the cathode material instead of $PbO_2$. Thus, the cathode composition for the experimental cells is: 79% electrolytic manganese dioxide (EMD), 9.5% graphite, 6.5% KOH solution and 5% $Bi_2O_3.3ZrO_2$. These experimental cells are discharged at a constant current of 274 mAmp (equivalent to a 3.9 ohm load) in the same manner as in discharge of the standard cell of Example 2. The specific capacity (mAmp-hr/g) of the $MnO_2$ in the experimental cells is calculated in each case in the manner described in Example 1.

For discharge at a constant current drain of 274 mAmp (3.9 ohm load) there is a decrease of 0.6% in the specific capacity of the $MnO_2$ in the experimental cell compared to that of the standard cell (Example 2) for continuous discharge to 1.0 volt and an increase of 6.2% for continuous discharge to 0.8 volt. At the same drain rate of 274 mAmp the specific capacity of the $MnO_2$ in the experimental cell compared to the specific capacity of the standard cell does not change for intermittent discharge to 1.0 volt but increases 5.5.% for intermittent discharge to 0.8 volt. These changes are summarized in Table 1.

Example 9

The same experimental cells as in Example 3 are prepared execpt that $K_2Cr_2O_7$ is added to the cathode material instead of $PbO_2$. Thus the cathode composition for the experimental cells is: 79% electrolytic manganese dioxide (EMD), 9.5% graphite, 6.5% KOH solution and 5% $K_2Cr_2O_7$. These experimental cells are discharged at a constant current of 274 mAmp (equivalent to an average load of 3.9 ohm) in the same manner as in discharge of the standard cell of Example 2. The specific capacity (mAmp-hr/g) of the $MnO_2$ in the experimental cells is calculated in the manner described in Example 1.

In each case the specific capacity of the $MnO_2$ in the experimental cell increases over the specific capacity of the $MnO_2$ in the standard cell for the corresponding discharge condition and current drain. Thus, at a constant current drain of 274 mAmp (3.9 ohm load) the increase in specific capacity of the $MnO_2$ in the experimental cell over that of the standard cell is 9.3% for continuous discharge to 1.0 volt and 18.1% for continuous discharge to 0.8 volt. At the same drain rate of 274 mAmp there is no change in specific capacity of the $MnO_2$ in the experimental cell over that of the standard cell for intermittent discharge to 1.0 volt and there is an increase of 5.5% in the specific capacity of the $MnO_2$ in the experimental cell over that of the standard cell for intermittent discharge to 0.8 volt. These changes are summarized in Table 1.

As seen from Table 1 the addition of any of the listed additives to the alkaline cell cathode results in an increase in the $MnO_2$ specific capacity at both continuous and intermittent discharge to 0.8 volts. If the amount of additive is adjusted, e.g. between 0.1% and 10%, preferably between about 0.1 and 5% by weight of the cathode, the service life of the cell can increase compared to the standard cell having an additonal (equal) amount of $MnO_2$ in place of the additive. In fact with the 5 wt% amount of additive employed in each of the above examples, service life of the cell when discharged to 0.8 volts increases over that of the standard cell when the additves $Bi_2O_3$, $PbO_2$, $SnO_2$ and $K_2Cr_2O_7$ are employed. The percent increase in service life in such cases are summarized in Table 1. The running voltage (i.e. the voltage vs. discharge time profile) of the cells containing the additives $PbO_2$ is measured to be higher than the running voltage of the standard cell. In general the increase in specific capacity of $MnO_2$ resulting from inclusion of any of the above described additives will tend to increase the running voltage of the experimental cell containing the respective additive.

TABLE 1

EFFECT OF CATHODE ADDITIVES

| CATHODE ADDITIVE[1] (5 wt %) | DISCHARGE TEST | Discharge to 1.0 Volts | | Discharge to 0.8 Volts | |
|---|---|---|---|---|---|
| | | % Increase Sp. Capacity of $MnO_2$ | % Increase Service Life of Cell[2] | % Increase Sp. Capacity of $MnO_2$ | % Increase Service Life of Cell[2] |
| $Bi_2O_3$ | Continuous | +9.0 | +2.5 | +12.0 | +5.3 |
| $Bi_2O_3$ | Intermittent[3] | +5.9 | −0.5 | +6.8 | +0.4 |
| $PbO_2$ | Continuous | +12.8 | +6.0 | +15.2 | +8.3 |
| $PbO_2$ | Intermittent[3] | +9.5 | +2.9 | +10.2 | +3.6 |
| $SnO_2$ | Continuous | +9.3 | +2.7 | +7.9 | +1.4 |
| $SnO_2$ | Intermittent[3] | +4.5 | −1.8 | +5.3 | −1.0 |
| $Co_3O_4$ | Continuous | +4.2 | −2.1 | +5.6 | −0.7 |
| $Co_3O_4$ | Intermittent[3] | +4.3 | −2.0 | +0.1 | −5.9 |
| CoO | Continuous | +7.0 | +0.6 | +4.7 | −1.6 |
| CoO | Intermittent[3] | −0.1 | −6.1 | +2.5 | −3.7 |
| $Bi_2O3.3ZrO_3$ | Continuous | −0.6 | −6.6 | +6.2 | −0.2 |
| $Bi_2O3.3ZrO_3$ | Intermittent[3] | 0.0 | −6.0 | +5.5 | −0.8 |
| $K_2Cr_2O_7$ | Continuous | +9.3 | +2.7 | +18.1 | +11.0 |

Notes:
1. Additive comprises 5 wt % of cathode.
2. Service life comparison to same cell with more $MnO_2$ in place of the additive.
3. Repetitive discharge cylces of 1 hour followed by 5 hour recovery.

Although the present invention was described with respect to specific embodiments, it should be recognized that variations, for example, in cell size are possible without departing from the concept of the invention.

What is claimed is:

1. A primary (non-rechargeable) electrochemical cell comprising an anode comprising zinc, an aqueous alkaline electrolyte solution comprising potassium hydroxide, a separator and a cathode comprising manganese dioxide, said cathode further comprising an additive selected from the group of compounds consisting of $Bi_2O_3$, $PbO_2$, $SnO_2$, $Co_3O_4$, CoO, $Bi_2O_3.3ZrO_3$ and $K_2Cr_2O_7$ and combinations thereof added in admixture with the manganese dioxide, and wherein said additive has the effect of increasing the specific capacity of the $MnO_2$ in the cathode when the cell is discharged to 0.8 volts.

2. A primary (non-rechargeable) electrochemical cell comprising an anode comprising zinc, an aqueous alkaline electrolyte solution comprising potassium hydroxide, a separator and a cathode comprising manganese dioxide, said cathode further comprising an additive selected from the group of compounds consisting of $SnO_2$, $Co_3O_4$, CoO, and $K_2Cr_2O_7$ and combinations thereof added in admixture with the manganese dioxide, and wherein said additive has the effect of increasing the specific capacity of the $MnO_2$ in the cathode when the cell is discharged to 0.8 volts.

3. A primary (non-rechargeable) electrochemical cell comprising an anode comprising zinc, an aqueous alkaline electrolyte solution comprising potassium hydroxide, a separator and a cathode comprising manganese dioxide, said cathode further comprising an additive selected from the group of compounds consisting of $Bi_2O_3$ and $PbO_2$ and combinations thereof added in admixture with the manganese dioxide, and wherein said additive has the effect of increasing the specific capacity of the $MnO_2$ in the cathode when the cell is discharged to 0.8 volts.

4. The cell of claim 1 wherein said additive comprises between about 0.1 and 10 percent by weight of the cathode.

5. The cell of claim 1 wherein the total mercury content in the cell is less than 50 parts per million of total cell weight.

6. A primary (non-rechargeable) electrochemical cell comprising an anode comprising zinc, an aqueous alkaline electrolyte solution comprising potassium hydroxide, a separator and a cathode comprising manganese dioxide, said cathode further comprising $PbO_2$ additive added in admixture with the manganese dioxide, and wherein said additive has the effect of increasing the specific capacity of the $MnO_2$ in the cathode when the cell is discharged to 0.8 volts.

* * * * *